(12) United States Patent
    Vakhovsky

(10) Patent No.: US 12,689,974 B2
(45) Date of Patent: Jul. 21, 2026

(54) AUTOMATED NETWORK SELECTION MANAGEMENT SYSTEM

(71) Applicant: Skytell AG, Zug (CH)

(72) Inventor: Felix Vakhovsky, Miami, FL (US)

(73) Assignee: Skytell AG, Zug (CH)

( * ) Notice: Subject to any disclaimer, the term of this patent is extended or adjusted under 35 U.S.C. 154(b) by 310 days.

(21) Appl. No.: 18/657,154

(22) Filed: May 7, 2024

(65) Prior Publication Data

US 2025/0351060 A1      Nov. 13, 2025

(51) Int. Cl.
    *H04W 48/18* (2009.01)
    *H04M 15/00* (2006.01)
    *H04W 8/18* (2009.01)
    *H04W 64/00* (2009.01)

(52) U.S. Cl.
    CPC ........... *H04W 48/18* (2013.01); *H04M 15/80* (2013.01); *H04W 8/183* (2013.01); *H04W 64/00* (2013.01)

(58) Field of Classification Search
    None
    See application file for complete search history.

(56) References Cited

U.S. PATENT DOCUMENTS

| | | | |
|---|---|---|---|
| 7,505,769 B2 | 3/2009 | Jiang | |
| 8,379,818 B2 | 2/2013 | Arsenault et al. | |
| 8,406,758 B2 | 3/2013 | Tagg et al. | |
| 9,008,654 B2 | 4/2015 | Sachanandani | |
| 9,113,308 B2 * | 8/2015 | Tagg ....................... | H04W 8/18 |
| 9,508,242 B2 | 11/2016 | Podlisker | |
| 9,603,006 B2 | 3/2017 | Evans et al. | |
| 2005/0075106 A1 | 4/2005 | Jiang | |
| 2009/0274284 A1 | 11/2009 | Arsenault et al. | |

* cited by examiner

*Primary Examiner* — Suhail Khan
(74) *Attorney, Agent, or Firm* — Pablo Meles; GrayRobinson, P.A.

(57)                    ABSTRACT

An automatic network selection management system (102) can include one or more processors and memory causing uploading (108) of tariffs, prices, whitelist calculation rules, and a list of an operator's subscribers and calculating (110) a whitelist for each subscriber to provide a list of authorized networks and routes in each country or region at each roaming sponsor or at each International Mobile Subscriber Identity (IMSI) sponsor. The system can receive (107) a location update with an IMSI sponsor and network and further periodically update a SIM or eSIM (112) with the whitelist. The system can further automatically select a network among the whitelist based on a periodically updated list of IMSIs for available sponsors in each country or region based on the location of a subscriber and further enable the connection from one party to another party using the automatically selected IMSI.

18 Claims, 2 Drawing Sheets

100

100

200

AUTOMATED NETWORK SELECTION MANAGEMENT SYSTEM

CROSS-REFERENCE TO RELATED APPLICATIONS

Not applicable.

TECHNICAL FIELD

The present disclosure generally relates to telecommunication network selection systems. More particularly, but not exclusively, the present disclosure relates to apparatus, systems, and methods that enable the automatic selection of a telecommunication network and the remote control of subscriber identity modules (SIMs) or eSIMs regardless of a subscriber's geographical location.

BACKGROUND

A mobile station international subscriber directory number (MSISDN) identifies a mobile subscriber and is used as a caller identification number when a phone call is placed from the mobile device. When a first user wants to call another mobile device user, the first user dials an MSISDN of the other party.

The MSISDN corresponds with an international mobile subscriber identity (IMSI), which uniquely identifies a subscriber in the telecommunication network. The IMSI information is stored in a subscriber identity module (SIM) or eSIM and does not change.

A single MSISDNs can be sent in this manner via a voice communication network, an short messaging service (SMS) network, a multimedia message service (MMS) network, or almost any other wired or wireless network. SMS and MMS networks are similar, but an SMS network is only capable of sending text whereas an MMS network can send multimedia content such as pictures, video, and audio in addition to text. Using MMS does require additional network infrastructure to process the additional data resulting from transmitting pictures, video and audio and typically requires an internet connection whereas an SMS text message does not. Typically, the internet connection for an MMS message is provided through cellular data networks.

SMS messages are sent over wireless networks, using standard cellular data packets for example, but other wireless networks such as WiFi can be used as well. An SMS message is sent from the sender's phone to the nearest base station or hub. That message is then sent to the SMS message center, which passes the message to a recipient. SMS message delivery generally takes no additional allocation of channels and can still work on non-packet switched infrastructure. SMS will work on a large number of digital networks as well including GSM in Europe, PCS in the Americas, and PDC in Japan, WiFi networks among others. Implementing SMS on a GSM network for example may require just one additional server that would be coupled between mobile base stations.

MMS messages use some of this sending infrastructure. But the process is slightly more complex. When an MMS message is sent, the MMS message is submitted to a multimedia messaging service center (MMSC). The MMSC sends an SMS notification to the SMSC (Short Message Service Center), which notifies the recipient's device that there's an MMS message waiting on the MMSC. Lastly, the recipient's phone retrieves the MMS message from the MMSC. Again, the process of sending an MMS versus and SMS message is similar, but the MMS message uses more resources. Also, note that almost any mobile device can receive an SMS message whereas a more advanced mobile device (such as a smartphone) would be needed to present an MMS message to display an image or video to show a complete MMS message. Further note that many communication devices utilize an API or an "Application Program Interface", which is a software intermediary that allows two applications to talk to each other.

With respect to MSISDNs, it is a technical term sometimes used for the mobile number attached to a SIM card or eSIM in a mobile phone. An MSISDN contains several significant numbers to identify country, destination, and subscriber number. Depending on the country, the MSISDN can generally be broken down like this:

MSISDN=CC+NDC+SN, CC=Country Code, NDC=National Destination Code and SN=Subscriber Number.

In countries like the USA, an NDC is used to identify a specific region within the country, but some countries do not use an NDC. When sending SMS via SMPP, the number must be provided in full international format in order to deliver to the GSM network correctly. Many usability problems can surround this as a large proportion of mobile subscribers are not aware of specific country codes.

Notwithstanding the above, existing systems fail to provide the automatic selection of roaming networks in a manner that is efficient and cost effective for both users and providers.

A glossary follows defining the terms and acronyms used in the industry and herein:

APDU Application Protocol Data Unit—the data unit of the card and terminal communication protocol.

eSIM Embedded Subscriber Identification Module is an electronic SIM card embedded in the device.

IMEI International Mobile Equipment Identity.

IMSI International Mobile Subscriber Identity.

MSISDN Mobile Station Integrated Services Digital Number—Subscriber's mobile number of a digital network with integrated services for communication in GSM, UMTS and other standards.

Live Location Update Procedure for updating the Subscriber's location in real time.

OTA Over-The-Air is a system that enables data transmission over the air.

PDU Protocol Data Unit.

SIM Subscriber Identification Module.

WL Whitelist—a list of authorized networks and routes (in each country) at each roaming or IMSI sponsor.

XML eXtensible Markup Language.

xRM Xtended Relationship management is business process automation system.

Applet A program that is integrated on the SIM cards/eSIMs, designed to provide interaction communication with the Subscriber.

DB Database management system.

S Software.

Subscription A set of values used to register in the network and receive communication services.

International telecommunication providers International traffic providers.

Roaming sponsor IMSI sponsor—an operator that leases IMSIs to be used in roaming.

Tariff A set of prices under the list of services provided.

Wholesale provider An operator providing transit services for voice traffic.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Back ground section should be treated as part of the inventor's approach to the particular problem, which, in and of itself, may also be inventive.

BRIEF DESCRIPTION OF DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
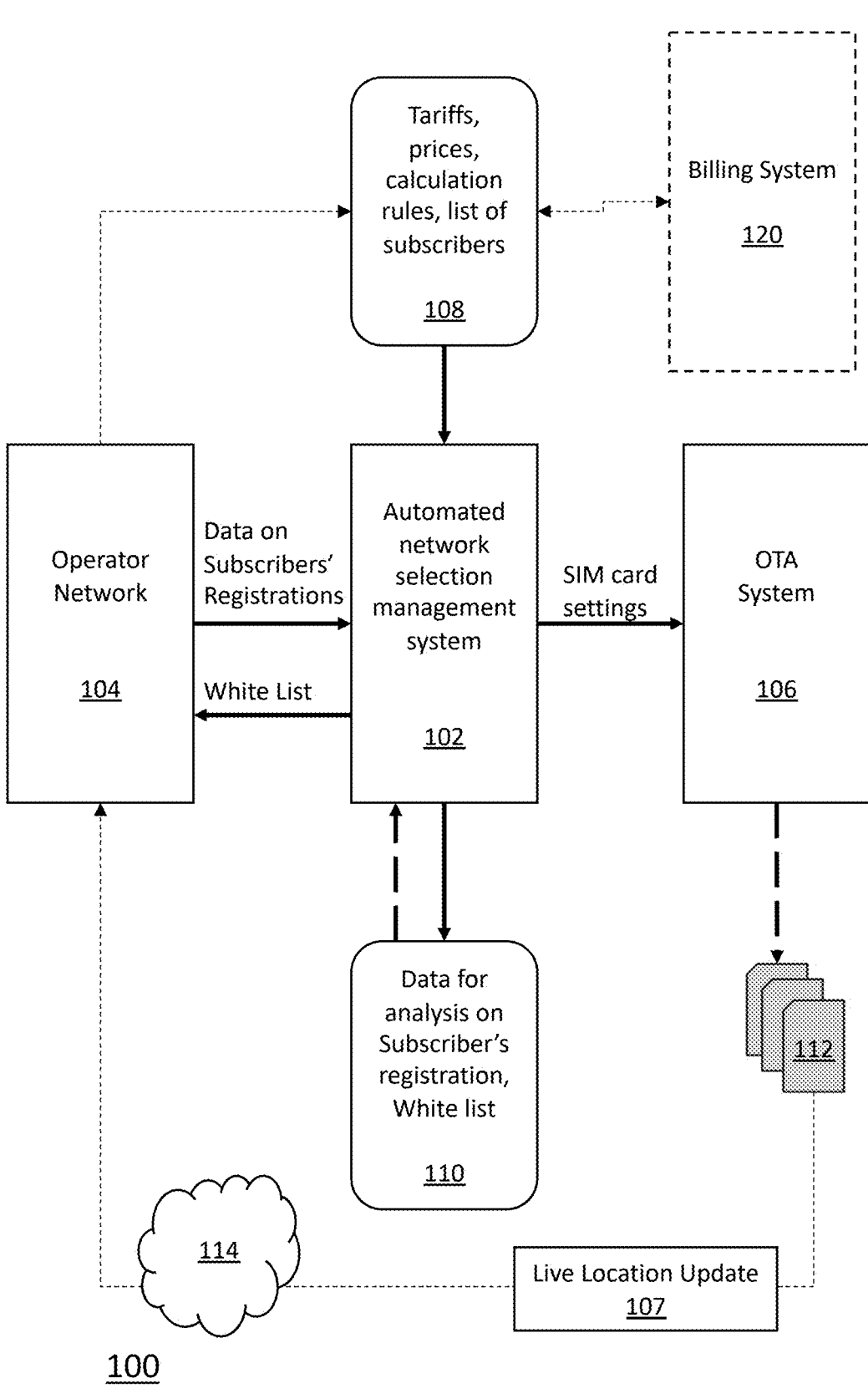
FIG. 1 illustrates a block diagram of an automated network selection management system, according to some embodiments.

An automated network selection management system is a developed hardware-software system (hereinafter referred to as «HSS») or information system (hereinafter referred to as «IS») which allows a mobile operator (or a virtual mobile operator) to continuously provide its Subscribers with high-quality mobile communication services regardless of the Subscribers' geographical location (worldwide), and with the most cost-effective inter-operator tariff for the mobile/virtual operator (in the event certain roaming sponsors have several VPLMN networks available).

The purpose of the developed information system (IS) is to automate the processes of configuration management of network nodes and SIM cards/eSIMs to select the most profitable VPLMN network at each roaming sponsor and wholesale provider in each particular month, based on the whitelist.

The automated system composes a priority list of authorized roaming and transit networks (whitelist) based on provided prices and destinations from roaming sponsors and wholesale providers and keeps the whitelist information in SIM cards/eSIMs up to date. Additionally, the system tracks the location of SIM cards/eSIMs in countries/regions and the relevance of the connected network in each country/region.

With the help of this automated system the mobile operator or virtual operator is provided with an opportunity to manage at least two VPLMN networks at each IMSI sponsor (and more) for connection on SIM cards/eSIMs to provide uninterrupted and high-quality communication services to its Subscribers, as well as remote connection control and change of priority priority network based on current inter-operator tariffs and quality of communication for each specific country/region, wherever the Subscriber is located.

If a mobile operator has two or more direct roaming agreements with roaming sponsors in addition to formal roaming agreements in a particular country, the IS allows the preferred registration network to be automatically selected among all the options from each IMSI sponsor or from the partners directly.

In case of inability to register in the priority network or other technical issues, automatic reconnection to the reserve network of a certain roaming sponsor is performed following the monthly updated whitelist, which specifies a predetermined prioritization of reconnection between networks.

Once technical issues and connection availability to the priority IMSI-sponsor are fixed, the IS provides an opportunity to reconnect the Subscriber via the OTA technology. That is, the IS automatically analyzes and identifies Subscribers who have connected with low (second) priority and after a time interval set by the operator remotely checks the possibility of resuming the priority IMSI-sponsor for the Subscriber in real time. IMSI-sponsor reconnection takes place until a stable connection is successfully established for connection of all mobile services for the Subscriber in a particular country/region.

Thus, the mobile network serving the Subscriber is controlled in real-time by the mobile operator through the Subscriber's SIM cards or eSIMs, whose setting are also remotely controlled through the IS that determines the optimal choice of the IMSI sponsor.

In addition, the automated network selection management system assumes the implementation of a certain trigger by which the Subscriber's Live Location Update will be determined correctly, i.e., to distinguish between short-term and long-term loss of signal.

In the event of a momentary loss of signal, a switchover to another network of the same IMSI sponsor takes place.

Short-term signal loss may be caused by the Subscriber staying in a tunnel, elevator, train or airplane, etc. In case of prolonged loss of signal, a switchover to an alternative IMSI sponsor network takes place. Prolonged loss of signal may be due to forced manual activation of the airplane mode by the Subscriber; or Subscriber manually switching off the phone for an indefinite period; or a prolonged emergency on the priority IMSI sponsor's network. The system further allows users to revert to using the sponsor's priority IMSI either automatically or manually.

In some embodiments, the system is implemented as a set of program modules running under LINUX OS.

Tariffs, prices, whitelist calculation rules, and the list of operator's Subscribers are uploaded into the system. Whitelist calculation and data loading is initiated by the operator in the backend. As a result of the calculation, the operator decides to upload the final whitelist to the operator's network and send the corresponding commands to the OTA system.

In the process of Subscribers' registration, information about the used networks of roaming partners is transferred to the network selection management system. The accumulated statistics can be used in the future to optimize the rules of whitelist generation.

Tariffs from roaming sponsors (Leg 1) and tariffs from international telecommunication providers (Leg 2) are uploaded in excel or csv or XML format. All tariffs are adjusted to a single format, using information on currency exchange rates, operators' names, operator's tariffs (min, SMS and data bundles for calculation).

Referring to FIG. 1, a block diagram and flow 100 of an automatic network selection management system 102 illustrating how a mobile operator or virtual mobile operator allows the continuous provision to its subscribers with communication services regardless of geographical location. The system can include one or more processors and memory coupled to the one or more processor, where the memory has computer instructions that when executed by the one or more processors causes the one or more processors to perform certain operations. In some embodiments, the operations include uploading at 108 tariffs, prices, whitelist calculation rules, and a list of an operator's subscribers and calculating at 110 a whitelist for subscribers to provide a list of authorized networks and routes in each country or region at each roaming sponsor or at each International Mobile Subscriber Identity (IMSI) sponsor. In some embodiments, the system 102 will continually receive (107) a location update with an IMSI sponsor and network for each subscriber and further periodically update a SIM or eSIM 112 at the subscriber with the whitelist. In some embodiments, the system 102 can use an over-the-air (OTA) system 106 to update SIM or eSIM 112. The system 102 can then automatically select an International Mobile Subscriber Identity (IMSI) among the whitelist based on a periodically updated list of IMSIs for available sponsors in each country or region based on the location of a subscriber and further enable the connection from a calling party to the called party using the automatically selected IMSI.

In some embodiments, the IMSI is a unique number, usually fifteen digits associated with Global System for Mobile Communications (GSM) and Universal Mobile Telecommunication System (UMTS) network mobile phone users. The IMSI is a unique number identifying a GSM subscriber. The number has two parts. The initial part is comprises of six digits in the North American Standard and five digits in the European Standard. It identifies the GSM network operator in a specific country with whom the subscriber holds an account. The second part is allocated by the network operator to uniquely identify the subscriber. The IMSI is stored in the SIM or eSIM inside the phone and is sent by the phone to the appropriate network. The IMSI is used to acquire the details of the mobile in the Home location Register (HLR) or the Visitor Location Register (VLR).

In some embodiments, the system 102 (and 110) composes the whitelist from a priority list of roaming and transit networks based on provided prices and destinations from roaming sponsors and wholesale providers.

In some embodiments the system 102 tracks the location of the SIM card or eSIM in the countries or regions and can check connected networks in each country or region or check information about the used networks of roaming partners as described above by analyzing information received in a process of subscribers' registration.

In some embodiments, the predetermined list of IMSIs is obtained from carriers available in specific countries or regions subscribed to a predetermined international private interchange network enabled for using multiple numbered and multi-IMSI subscribers.

In some embodiments, the one or more processors are further configured to perform the priority network setting based on current inter-operator tariffs and quality of communication for each specific country/region, further based on where the Subscriber is located. In yet other embodiments, the one or more processors are configured to perform the operations of setting a priority to a network that has greater profitability when two or more networks are available at different costs. In some embodiments, the parameter of profitability is predetermined by a routing command based on the cost of a combination of voice, short messaging service (SMS), and data.

In some embodiments, the system 102 connects to a network using the automatically selected IMSI within a given time frame.

In some embodiments, if a selected IMSI signal or network signal is lost, then an automatic connection to an alternative IMSI or alternative network in the whitelist occurs based on the periodically updated list of IMSIs which indicates a specific reconnection sequence from one IMSI to another and from one network to another. In some embodiments, once a stable signal has been reestablished with the preferred IMSI sponsor or network, a subscriber is automatically switched back after checking the signal availability periodically for the preferred IMSI sponsor and/or Network, based on a subscribers live location update.

In some embodiments, the one or more processors are further configured to perform the operations of switchover to another network of the same IMSI sponsor when there is a detection of a subscriber in a black zone. In some embodiments, a black zone is one among a lack of network conditions of being in an elevator, train, tunnel, airplane, or a subscriber turning on an airplane mode or turning off their phone, or a loss of signal from an IMSI sponsor or network.

In some embodiments, the one or more processors are configured to automatically analyze and identify subscribers who have connected with something other than a priority connection and periodically remotely checks for a possibility to resume a priority IMSI-sponsor connection for the subscriber in real time.

In some embodiments, the one or more processors are configured to determine between a short-term and a long-term loss of signal for the live location update, wherein a switchover to another network of the same IMSI sponsor occurs when the short-term loss of signal is indicated and a switchover to an alternative IMSI sponsor network occurs when the long-term loss of signal is indicated.

In some embodiments, the system runs under a LINUX operating system although the embodiments are not necessarily limited to one operating system or another.

In some embodiments, the system uploads data from mobile operators or virtual mobile operators, adjusts the data to a single format from a list of operators, adjusts pricing to a single currency based on up-to-date currency exchange rates, calculates the whitelist from roaming sponsors (Leg 1) and from international telecommunication providers (Leg 2), and establishes time limits for validity of the whitelist.

In some embodiments and referring again to FIG. 1, the block diagram and flow chart 100 of an automatic sponsor selection management system 102 allows a mobile operator to continuously provide its subscribers with communication services regardless of geographical location. In some embodiments, the system includes one or more processors and memory coupled to the one or more processor, where the memory has computer instructions that when executed by the one or more processors causes the one or more processors to perform certain operations. In some embodiments, the operations can include uploading 108 tariffs, prices, whitelist calculation rules, and a list of an operator's subscribers, calculating 110 a whitelist for each subscriber to provide a list of authorized partners based on provided prices and destinations from roaming sponsors in each country or region at each roaming sponsor, continually receiving at 107 a location update with an International Mobile Subscriber Identity (IMSI) sponsor and network for each subscriber, and periodically updating a SIM or eSIM 112 at the subscriber with the whitelist which can be done through an OTA system 106. In some embodiments, the system 102 automatically selects an International Mobile Subscriber Identity (IMSI) among the whitelist based on a periodically updated list of IMSIs for available sponsors in each country or region based on the location of a subscriber and enables the connection between parties using the automatically selected IMSI.

Figure 2:
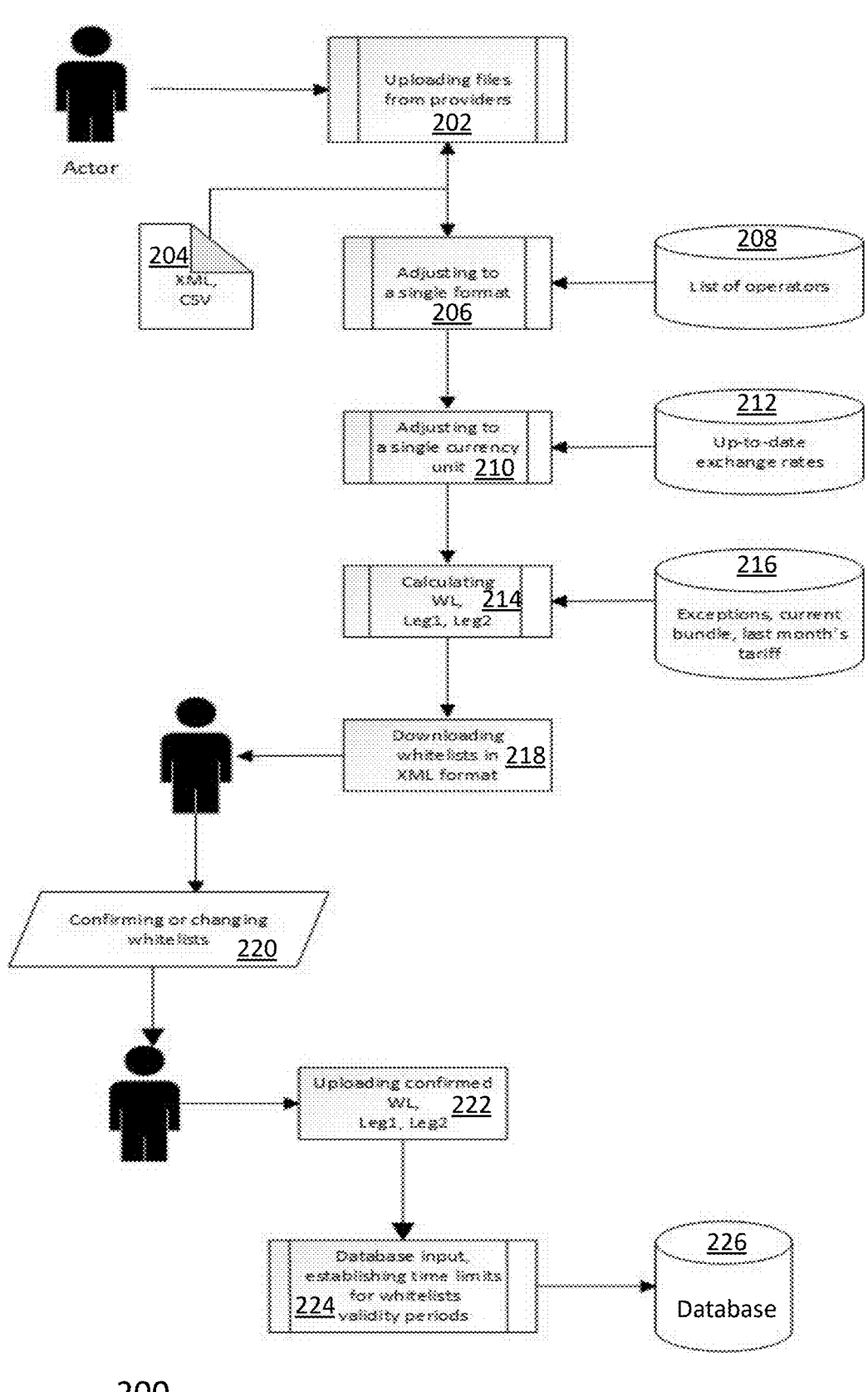
FIG. 2 illustrates a flow chart for a white list calculation process, according to some embodiments.

Referring to FIG. 2, a flowchart illustrates a method 200 of automated calculation or an automated system for network selection in the system of FIG. 1. In some embodiments, the system stores up-to-date and historical data of calculation results—lists of priority networks and priority routes. The system allows viewing all lists and provides import/export of lists in xls format.

The system or method 200 can begin by uploading files from providers at 202. As previously mentioned, the files can be in XML or CSV (or excel) format as noted at 204. At 206, the data from a list of operators 208 can be adjusted to a single format. A source or sources of up-to-date exchange rates at 212 can be used to adjust pricing to a single currency at 210. Exceptions, current bundles, or last month's tariff information at 216 can be further used to calculate at 214 whitelists from roaming sponsors (Leg 1) and from international telecommunication providers (Leg 2). The white lists can be downloaded in XML format at 218 and a party that can do some verification can further confirm or charge the white lists at 220. At 222, the system can upload confirmed white lists including from Leg 1 and Leg 2. In some embodiments as shown at 224, the white lists are input into a database 226 that can further establish time limits or validity periods for when the white lists are effective.

In some embodiments, the system includes automatic and manual update distribution to Subscribers. To send information to Subscribers about the priority networks update, the subsystem interacts with the external OTA platform via an xRM bus to send PDU messages to Subscribers. The system provides the possibility of automatic and manual distribution of updates to Subscribers. The system facilitates requests generation, transmission, execution control, error management, and combining requests into campaigns.

In some embodiments, the system contains a module for generating/decoding PDU and APDU for interaction with SIM cards/eSIMs and applets. It is possible to manually use the module via a WEB interface.

In some embodiments, the system can include automatic APDU generation and sending APDU subscription update messages (IMSI) to Subscribers, based on changes in the list of priority sponsor networks, considering the status of these lists on the SIM cards/eSIMs side (data is taken from the Subscribers' SIM cards/eSIMs status data aggregation module).

In some embodiments, it is possible to set criteria for automatic distribution of priority network update messages.

In some embodiments, a process of collecting and examining data on Subscribers can include a subsystem that interacts with the network core and billing via the xRM bus to obtain up-to-date data on Subscribers. In some embodiments, the subsystem receives and stores, as a minimum requirement, the following Subscriber data: Subscriber's identification data: main IMSI and MSISDN, full name, contract number; Data about existing (downloaded) subscriptions; Data on Subscriber's most recent network registration status; Data on the status of priority networks; Historical data on network registration, service rejections; and Data on changes to the existing subscription.

In some embodiments, the system displays available data on the Subscriber's location on the map, based on data from the operator's network. The system can support searching for information on Subscribers, the ability to display existing subscriptions, available numbers, historical data. In some embodiments, automatic notification of system users can be done in case of Subscribers' registration in a non-priority network.

In some embodiments, a subscriber identity module (SIM) or eSIM 112 operating in conjustion with a network selection management system 102 allowing a mobile operator to continuously provide its subscribers with communication services regardless of geographical location. In some embodiments, the SIM or eSIM can include one or more processors and memory coupled to the one or more processor, the memory having computer instructions that when executed by the one or more processors causes the one or more processors to perform certain operations. The operations can include periodically receiving at the SIM or eSIM at the subscriber a whitelist, wherein the whitelist is calculated for the subscriber to provide a list of authorized partners based on provided prices and destinations from roaming sponsors in each country or region at each roaming sponsor using uploaded tariffs, prices, whitelist calculation rules, and a list of an operator's subscribers and providing a location update with an International Mobile Subscriber Identity (IMSI) sponsor and network for the subscriber to the automatic network system, wherein the system automatically selects an International Mobile Subscriber Identity (IMSI) among the whitelist based on a periodically updated list of IMSIs for available sponsors in each country or region based on the location of a subscriber.

In the absence of any specific clarification related to its express use in a particular context, where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a small cell networking device may be described as being mounted "substantially vertical," In these cases, a device that is mounted exactly vertical is mounted along a "Y" axis and a "X" axis that is normal (i.e., 90 degrees or at right angle) to a plane or line formed by a "Z" axis. Different from the exact precision of the term, "vertical," and the use of "substantially" or "about" to modify the characteristic permits a variance of the particular characteristic by up to 30 percent.

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" or "some embodiments" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or idea.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As the context may require in this disclosure, except as the context may dictate otherwise, the singular shall mean the plural and vice versa. All pronouns shall mean and include the person, entity, firm or corporation to which they relate. Also, the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

What is claimed:

1. An automatic network selection management system allowing a mobile operator or virtual mobile operator to continuously provide its subscribers with communication services regardless of geographical location, the system comprising:

one or more processors;

memory coupled to the one or more processor, the memory having computer instructions that when executed by the one or more processors causes the one or more processors to perform the operations of:

uploading tariffs, prices, whitelist calculation rules, and a list of an operator's subscribers;

calculating a whitelist for each subscriber to provide a list of authorized networks and routes in each country or region at each roaming sponsor or at each International Mobile Subscriber Identity (IMSI) sponsor;

continually receiving a location update with an IMSI sponsor and network for each subscriber;

periodically updating a SIM or eSIM at the subscriber with the whitelist;

automatically selecting an International Mobile Subscriber Identity (IMSI) among the whitelist based on a periodically updated list of IMSIs for available sponsors in each country or region based on the location of a called party; and enabling a connection from one party to another party using the automatically selected IMSI.

2. The automatic network selection management system of claim 1, wherein a first set of numbers of the IMSI identifies a GSM operator in a specific country with whom the user is subscribed to and a second set of numbers of the IMSI identifies an allocated number by the GSM operator that uniquely identifies the subscriber.

3. The automatic network selection management system of claim 1, wherein the system composes the whitelist from a priority list of roaming and transit networks based on provided prices and destinations from roaming sponsors and wholesale providers.

4. The automatic network selection management system of claim 1, wherein the system tracks the location of the SIM card or eSIM in the countries or regions and checks connected networks in each country or region by analyzing information received in a process of a subscriber's registration.

5. The system of claim 1, wherein the predetermined list of IMSIs is defined based on information provided by carriers available in specific countries or regions.

6. The system of claim 1, wherein the one or more processors are further configured to perform the operations of priority network setting based on current inter-operator tariffs and quality of communication for each specific country/region, further based on where a subscriber is located.

7. The system of claim 1, wherein the one or more processors are further configured to perform the operations of setting a priority to a network that has greater profitability when two or more networks are available at different costs.

8. The system of claim 7, wherein the parameter of profitability is predetermined by a routing command based on the cost of a combination of voice, short messaging service (SMS), and data.

9. The system of claim 1, wherein the system connects to network using the automatically selected IMSI within a given time frame.

10. The system of claim 1, wherein if a selected IMSI signal or network signal is lost, then an automatic connection to an alternative IMSI or alternative network in the whitelist occurs based on the periodically updated list of IMSIs which indicates a specific reconnection sequence from one IMSI to another and from one network to another.

11. The system of claim 10, wherein once a stable signal has been reestablished with the preferred IMSI sponsor or network, a subscriber is automatically switched back after checking the signal availability periodically for the preferred IMSI sponsor and/or Network, based on a subscribers live location update.

12. The system of claim 1, wherein the one or more processors are further configured to perform the operations of communicating the live location update to a billing and cross-roaming system to ensure a constant synchronization between the billing and cross-roaming system and the selection management system.

13. The system of claim 1, wherein detection of a black zone is one among a lack of network conditions of being in an elevator, train, tunnel, airplane, or a subscriber turning on an airplane mode or turning off their phone, or a loss of signal from a network.

14. The system of claim 1, wherein the one or more processors are configured to automatically analyze and identify subscribers who have connected with something other than a priority connection and periodically remotely checks for a possibility to resume a priority network connection for the subscriber in real time.

15. The system of claim 1, wherein the one or more processors are configured to determine between a short-term and a long-term loss of signal for the live location update, wherein a switchover to another network of the same IMSI sponsor occurs when the short-term loss of signal is indicated and a switchover to an alternative IMSI sponsor network occurs when the long-term loss of signal is indicated.

16. The system of claim 1, wherein the system runs under a LINUX operating system.

17. The system of claim 1, wherein the system uploads data from roaming sponsors and telecommunication providers, adjusts the data to a single format from a list of operators, adjusts pricing to a single currency based on up-to-date currency exchange rates, calculates the whitelist from roaming sponsors (Leg 1) and from international telecommunication providers (Leg 2), and establishes time limits for validity of the whitelist.

18. An automatic network selection management system allowing a mobile operator to continuously provide its subscribers with communication services regardless of geographical location, the system comprising:

one or more processors;

memory coupled to the one or more processor, the memory having computer instructions that when executed by the one or more processors causes the one or more processors to perform the operations of:

uploading tariffs, prices, whitelist calculation rules, and a list of an operator's subscribers;

calculating a whitelist for each subscriber to provide a list of authorized networks and routes in each country or region at each roaming sponsor or at each International Mobile Subscriber Identity (IMSI) sponsor;

continually receiving a location update with an IMSI sponsor and network for each subscriber;

periodically updating a SIM or eSIM at the subscriber with the whitelist;

automatically selecting a network of sponsored International Mobile Subscriber Identity (IMSI) among the whitelist based on a periodically updated list of IMSIs and networks for available sponsors in each country or region based on the subscriber location; and enabling a connection from one party to another party using the automatically selected network of sponsored IMSI.

* * * * *